United States Patent Office 3,590,097
Patented June 29, 1971

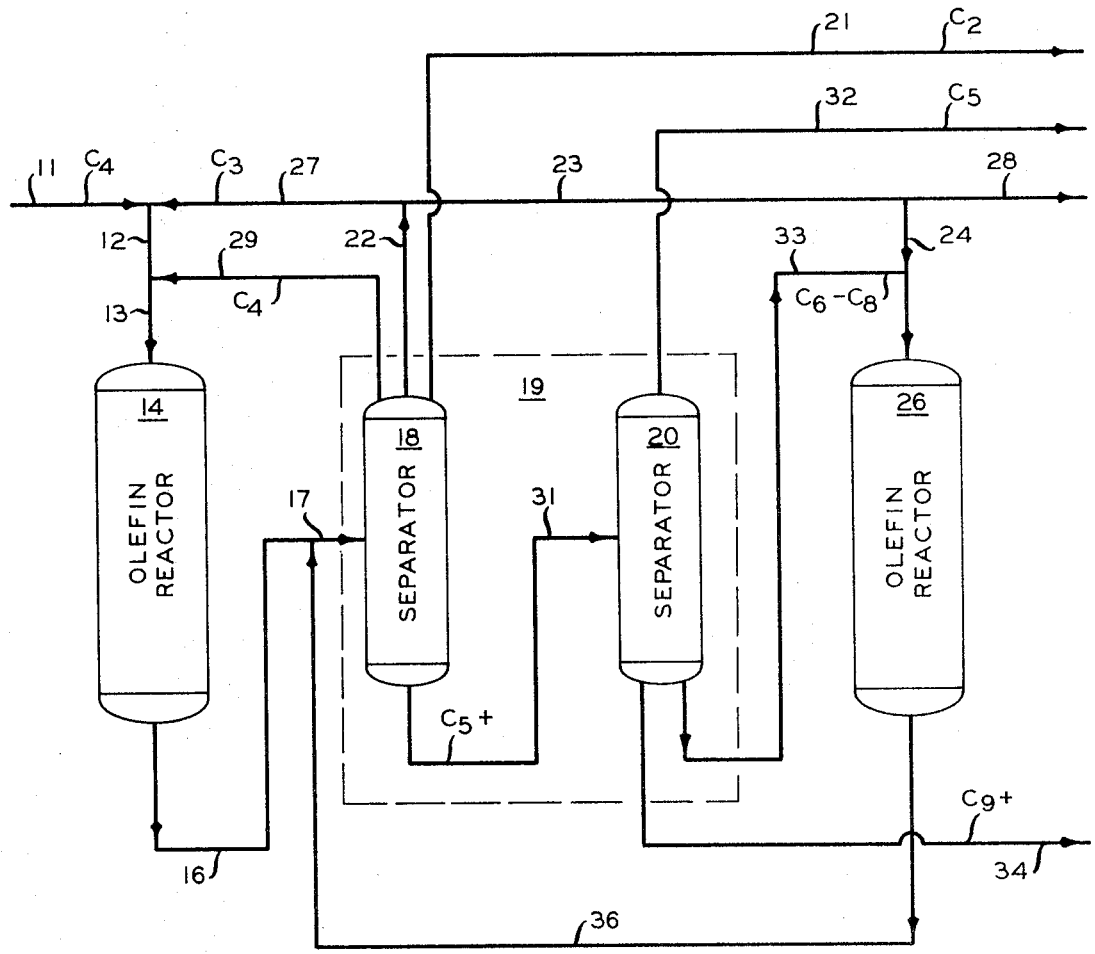

3,590,097
CONVERSION OF MIXED BUTENES TO ISOAMYLENES
Robert L. Banks and Robert B. Regier, Bartlesville, Okla., assignors to Phillips Petroleum Company
Filed Apr. 18, 1968, Ser. No. 722,263
Int. Cl. C07c 3/62
U.S. Cl. 260—683    3 Claims

ABSTRACT OF THE DISCLOSURE

Mixed normal butenes and isobutene are converted to produce isoamylene by a first olefin reaction to produce isoamylenes and a heavier branched olefin, and the heavier branched olefin is converted, together with propylene, in a second olefin reaction zone to produce additional isoamylenes.

---

This invention relates to the production of isoamylenes from mixed butenes. In one aspect, it relates to a process for the production of isoamylenes from mixed butenes utilizing the olefin reaction and separation steps.

In many instances, it is desirable to convert one acyclic olefin hydrocarbon to produce another acyclic olefin hydrocarbon. For example, isoamylene, which is a valuable intermediate for the production of isoprene, is a desirable product to produce from a relatively inexpensive and readily available feed stock, such as mixed butenes.

An object of the invention is to produce isoamylenes from mixed butenes. Another object of the invention is to improve the efficiency of conversion of mixed butenes to isoamylene. Other aspects, objects and the advantages of the invention are apparent in the written description, the drawing, and the claims.

According to the invention, mixed normal butenes and isobutene are converted in a first olefin reaction zone to produce isoamylene and a heavier branched olefin by-product, and the heavier branched olefin by-product is converted in a second olefin reaction zone in the presence of propylene to produce additional isoamylene, as well as additional isobutene for use in the first olefin reaction zone, produced ethylene being substantially all removed from the propylene fed to the second olefin reaction zone.

The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of n-butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium or tellurium or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten or rhenium or by magnesium tungstate or beryllium phosphotungstate;

(4) Silica, alumina, aluminum phosphate, zirconium phosphate, calcium phosphate, magnesium phosphate, or titanium phosphate promoted by a hexacarbonyl of molybdenum or tungsten; and (5) Homogeneous olefin reaction catalysts where appropriate. In such embodiments, catalyst removal and/or recovery steps normally are required. For example, transition metal-containing homogeneous catalyst systems, active for the disproportionation of olefins, can be used. An example of one such catalyst system is bis(triphenylphosphine)dinitrosyldichloromolybdenum and methylaluminum sesquichloride which can be used at atmospheric pressure, room temperature, and preferably in the presence of a reaction diluent. Some suitable homogeneous catalyst systems are disclosed and claimed in U.S. Ser. Nos. 635,-649 (now abandoned), 635,657 (now abandoned), 635,-669 (now abandoned), 635,693 (now abandoned), 635,-708, filed May 3, 1967; 694,872 (now abandoned), 694,-873 (now abandoned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium or tellurium compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organoaluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

Depending upon the specific feed materials and the specific catalysts being used, any conventional contacting technique can be utilized, such as fixed bed reaction, fluidized bed reaction, liquid phase batch reaction, and the like.

At the completion of the reaction, the reaction mixture can be processed to recover any desired product by any conventional means such as fractionation, crystallization, adsorption, and the like. Unreacted materials or products not in the desired molecular weight range can be recycled.

The drawing is a simplified schematic representation of an embodiment of the invention. As shown in this figure, a mixed butene stream, containing at least about 50 mole percent isobutene and a substantial amount of butene-2, is conducted to a first olefin reaction unit containing an olefin disproportionation catalyst such as silica-supported tungsten oxide. The feed stream is also blended with recycle butenes and some recycle propylene. The operating conditions of this unit are such that a substantial amount of isoamylenes are produced. The effluent from this unit contains isoamylenes, ethylene, some n-pentenes, some isohexenes and heavier by-product olefins, as well as unconverted reactants.

After suitable separation, the ethylene from the effluent from the first olefin reaction zone is removed from the process. If desired, the ethylene can, of course, be converted to other products and returned to the process. For example, the ethylene can be dimerized and returned as butene. Mixed butenes, including some propylene, are recycled to the first catalytic unit in proportions such that the isobutenes represent about 50 mol percent of the total olefin feed. Isoamylenes, containing a small amount of n-pentene impurities, are recovered as a product, and heavier by-product olefins containing from 6 to about 8 carbon atoms are conducted to a second olefin reaction unit. Heavier olefins, containing 9 carbon atoms or more, are rejected from the process.

In the second olefin reaction unit, the heavier olefins are contacted with another bed of an olefin disproportionation catalyst, such as silica-supported tungsten oxide catalyst. Before contact with the catalyst, the heavy olefin containing stream is blended with propylene recovered from the first unit, in proportions which can range from about 1 to about 20, preferably 1 to about 3 moles of propylene per mole of heavy olefin. The heavier olefins are reacted in the presence of propylene in this unit and the effluent contains isobutene, n-butenes, additional isoamylenes, as well as unconverted reactants. The isoamylenes are recovered and the butenes are recycled to the first catalytic unit. Ethylene is removed from the process as a by-product.

It has been found that the heavier, generally branched, olefin by-products can be effectively reacted with propylene, and that propylene has an advantage in the combination of the invention over ethylene. For example, in a run at 840° F., 300 p.s.i.g., and 60 weight hourly space velocity, pounds reactant per pound of catalyst per hour (WHSV), the conversion of hexenes with propylene was found to be 50 percent; the yield of the preferred isoamylenes was found to be 0.5 pound of isoamylene per pound of converted hexenes. In a similar run but using ethylene in place of propylene, the conversion of hexenes was higher, being 70 percent, but the yield of isoamylenes was less than 0.3 pound per pound of converted hexene. Therefore, propylene is preferred since a larger net production of isoamylenes per pass of hexene is achieved. The present invention is, of course, even more beneficial in those situations in which propylene is a less expensive feed stock than ethylene.

Referring to the drawing, a mixed stream of normal and isobutene is fed through pipe 11 and passed through pipe 12 and pipe 13 into reactor 14. The effluent from reactor 14 is passed through pipe 16 and pipe 17 into separator 18 of separation zone 19. Separation zone 19 comprises separators 18 and 20 and related connecting pipes. Ethylene is removed from separator 18 through pipe 21. Propylene is removed through pipe 22 and passed through pipe 23 into pipe 24 and to olefin reactor 26. If desired, propylene can also be passed through pipe 27 to olefin reactor 14 or, if produced in excess, can be removed from the system through pipe 28. Butenes are recycled from separator 18 to reactor 14 through pipe 29. C$_5$ and heavier olefins are passed through pipe 31 to separator 20. A C$_5$ stream, comprising isoamylene, is removed through pipe 32. $C_6$–$C_8$ olefins are passed through pipe 33 into olefin reactor 26. If desired, $C_9$ and heavier olefins are removed through pipe 34. The effluent from olefin reactor 26 is passed thorugh pipe 36 back to separation zone 19.

In an example according to the invention, as illustrated in the drawing, in reactor 14 and in reactor 26, the catalyst is tungsten oxide supported on silica, the catalyst comprising 8 weight percent tungsten oxide and 92 weight percent silica. In reactor 14, the temperature is 780° F., the pressure 300 p.s.i.g. and the rate 50 WHSV. The reactor contains 1100 pounds of catalyst. In reactor 26, the temperature is 840° F., the pressure 300 p.s.i.g., the rate 60 WHSV and the catalyst contains 180 pounds of catalyst. Such a system is designed to produce 68,000 metric tons per year of isoamylenes. The composition of the various streams in the process are set forth in the table below.

The isoamylenes product of the present invention contains a relatively small amount of n-amylene. These can be removed by extensive separation steps. However, such a product is entirely suitable for dehydrogenation to isoprene.

the carbon atoms of said first pairs, the two carbon atoms of each of said new pairs being connected by an olefinic double bond;

separating in a separation zone said first stream to remove substantially all of the ethylene therefrom and provide a second stream comprising said heavier olefins; and converting said second stream comprising said heavier olefin together with propylene in a second olefin reaction zone to produce additional isoamylene.

2. The process of claim 1 wherein:

said propylene is produced in said first olefin reaction zone; and additional normal and isobutene are produced in the conversion of said second stream in said second olefin reaction zone, and are returned to said first olefin reaction zone.

3. The process of claim 2 wherein:

said at least one heavier olefin is $C_6$ olefin;

the effluent from said second olefin reaction zone is fed to said separation zone; and butenes are recycled to said first olefin reaction zone from said separation zone.

TABLE

| Moles/hour | 11 | 13 | 16 | 17 | 21 | 22 | 24 | 27 | 28 | 29 | 31 | 32 | 33 | 34 | 36 |
|---|---|---|---|---|---|---|---|---|---|---|---|---|---|---|---|
| $C_2^=$ | | | 102 | 107 | 107 | | | | | | | | | | 5 |
| $C_3^=$ | | 115 | 235 | 265 | | 265 | 88 | 115 | 62 | | | | | | 30 |
| $iC_4^=$ | 224 | 475 | 223 | 251 | | | | | | | 251 | | | | 28 |
| $nC_4^=$ | 212 | 410 | 164 | 198 | | | | | | | 198 | | | | 34 |
| $iC_5^=$ | | | 219 | 240 | | | | | | | | 240 | 240 | | 21 |
| $nC_5^=$ | | | 16 | 26 | | | | | | | | 26 | 26 | | 10 |
| $C_6$–$C_8$ | | | 40 | 80 | | | | | | | | 80 | | 80 | 40 |
| $C_9^+$ | | | 1 | 1 | | | | | | | | 1 | | 1 | |
| Total | 436 | 1,000 | 1,000 | 1,168 | 107 | 265 | 88 | 115 | 62 | 449 | 347 | 266 | 80 | 1 | 168 |

We claim:

1. A process for converting n-butene and isobutene to produce isoamylene, comprising the steps of:

converting n-butene and isobutene in a first olefin reaction zone to produce a first stream comprising ethylene, isoamylene and at least one heavier branched olefin by-product by the olefin reaction which, as defined herein, can be visualized as comprising the reaction between two first pairs of carbon atoms, the two carbon atoms of each first pair being connected by an olefinic double bond, to form two new pairs from

References Cited

UNITED STATES PATENTS

| 3,261,879 | 7/1966 | Banks | 260—683 |
| 3,365,513 | 1/1968 | Heckelsberg | 260—683 |
| 3,457,320 | 1/1969 | Stapp et al. | 260—683 |

OTHER REFERENCES

Bradshaw et al.: Olefin Dismutation, Journal of Catalysis, vol. 7, pp. 269–276 (1967).

DELBERT E. GANTZ, Primary Examiner

C. E. SPRESSER, JR., Assistant Examiner